(No Model.)

L. T. FOSS.
ARTIFICIAL TOOTH.

No. 275,626. Patented Apr. 10, 1883.

Witnesses.
John F. C. Freinkert
Fred A. Purcell

Inventor:
Lewis T. Foss.
By Crosby Gregory attys.

UNITED STATES PATENT OFFICE.

LEWIS T. FOSS, OF BOSTON, MASSACHUSETTS.

ARTIFICIAL TOOTH.

SPECIFICATION forming part of Letters Patent No. 275,626, dated April 10, 1883.

Application filed November 17, 1882. (No model.)

*To all whom it may concern:*

Be it known that I, LEWIS T. FOSS, of Boston, county of Suffolk, and State of Massachusetts, have invented an Improvement in Artificial Teeth, of which the following description, in connection with the accompanying drawings, is a specification, like letters on the drawings representing like parts.

My invention has for its object to provide means by which any matter resulting from the disease of the gum or jaw about an ulcerated or diseased natural root or stump having an artificial crown attached to it by a plug may be discharged from the inner end of the stump, thus avoiding great pain, obviating lancing of the gums or extracting the stump.

In accordance with my invention, the nerve of the stump or root having been killed, I form the hole through the root or stump of proper size to receive into it a small platinum tube, the end of which is extended to the inner end of the root, and I fasten this tube, which I call an "eduction-tube," into the root by any suitable cement. The crown employed has an attached metal back plate provided with a short tube, called by me the "back-plate tube," which is slipped over the outer end of the eduction-tube and into the cavity of the stump or root, and fastened by suitable cement. If the tooth be in a healthy condition, the eduction-tube may be filled with any suitable absorbent filling, preferably floss-silk, and its lower end closed in any suitable manner to prevent the entrance of air, and is kept closed so long as the root does not give trouble; but if there should be inflammation about the root, or an abscess or other diseased condition, then the eduction-tube will be unstopped and be permitted to act as a discharge from the inflamed or abscessed part. When artificial crowns are connected with natural roots by plugs, it invariably results sooner or later that an abscess is formed which gives great pain and discomfort until the abscess is discharged; but by providing the stump or root with an eduction-tube to carry away any accumulations by reason of disease at the end of or about the root, much pain and discomfort may be obviated.

Figure 1:
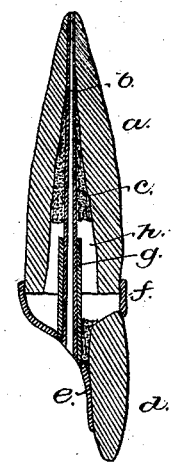
Figure 2:
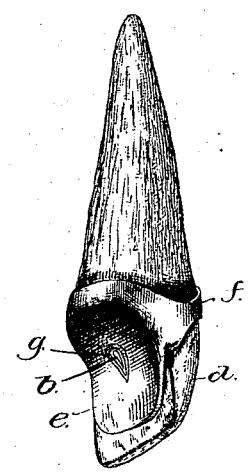

Figure 1 represents in vertical section a natural root or stump and artificial crown attached according to my improved method; and Fig. 2, a perspective view of the same, partially from the rear side of the tooth.

The root or stump *a*, supposed to be in a human jaw, after having been prepared in the usual manner, will have its inner cavity made of suitable size to receive in it and permit the passage of a small platinum eduction-tube, *b*, through the root or stump to its inner end, as shown in Fig. 1, and this tube will be secured in the root by suitable cement or equivalent material, as at *c*. The crown *d*, of suitable shape and size, has a metal back plate, *e*, attached to it in any usual manner, and a band or collar, *f*, and then to the back plate I add the back-plate tube *g* by solder or otherwise, leaving its ends open. The back-plate tube is of a size to just fit the outer side of the eduction-tube, and slipped upon the outer end of the eduction-tube and into the cavity *h* of the root or stump; the said cavity having been filled with cement, the crown and its attached parts will be firmly united with the root and eduction-tube. The eduction-tube may terminate at the junction of the tube *g* and back plate, or terminate within the back-plate tube, the latter thus forming a continuation of it.

The operator, if the root appears not to have diseased or inflamed parts about it, will fill the eduction-tube with floss-silk or other suitable material, and stop the outer end with cement or gold, which may be easily picked out of it if it be desired to open the eduction-tube for the escape of material to relieve or discharge an abscess, and as long as the necessity exists the eduction-tube may be kept open as a discharge-tube, thus avoiding much pain and obviating lancing or the extraction of the root. To the majority of patients having a tooth-crown set on a natural root or stump, this method of connecting the crown and root and the eduction-tube will prove of the greatest relief.

The eduction-tube may be readily cleaned out to the inner end of the root. The open eduction-tube affords opportunity, if desired, for the introduction of any liquid or other healing mixture to the diseased parts about the root.

I claim—

1. An artificial crown and attached back plate and back-plate tube, combined with an eduction-tube open at both ends, and adapted to extend into and through to the end of the root or stump, as and for the purpose described.

2. The crown and attached back plate and the back-plate tube g, longer than the band or collar f, to extend into the hollow of the root or stump to be secured thereto by cement, combined with the eduction-tube fitted to the back-plate tube and adapted to extend up into the hole made through to the end of the root, as shown and described.

3. That improvement in the art or method of setting artificial crowns upon natural roots or stumps which consists in preparing the stump for the collar and perforating such stump for the eduction-tube, inserting the eduction-tube into and through the said perforated stump to its inner end, securing the eduction-tube in said stump, and applying to the said eduction-tube the crown provided with the back plate and back-plate tube, all substantially as described.

In testimony whereof I have signed my name to this specification in the presence of two subscribing witnesses.

LEWIS T. FOSS.

Witnesses:
G. W. GREGORY,
B. J. NOYES.